C. Melone,
Cage Trap,
No. 53,164.          Patented Mar. 13, 1866.
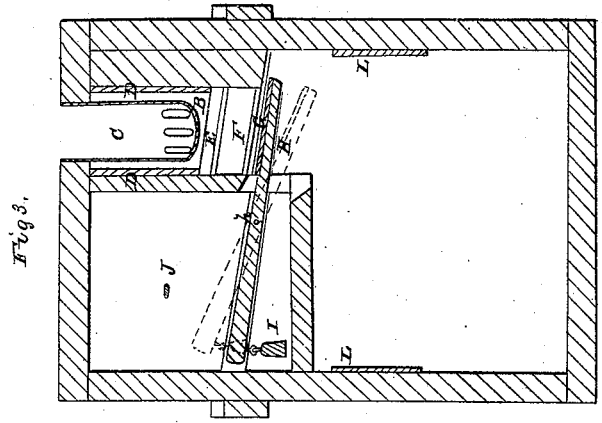
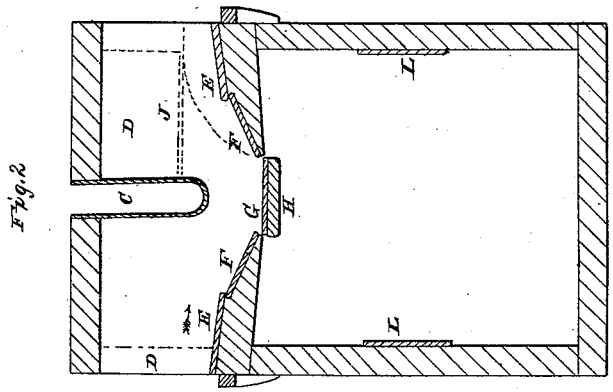
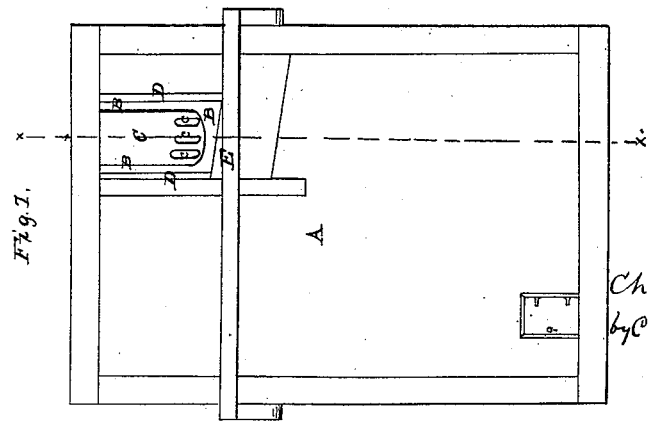
Witnesses
G. B. Archds
Harry Price
Inventor
Charles Malone
by Coburn & Mans
attorneys

UNITED STATES PATENT OFFICE.

CHARLES MELONE, OF LAWRENCE, KANSAS.

IMPROVEMENT IN ANIMAL-TRAPS.

Specification forming part of Letters Patent No. 53,164, dated March 13, 1866.

*To all whom it may concern:*

Be it known that I, CHARLES MELONE, of Lawrence, in the county of Douglas and State of Kansas, have invented a new and useful Improved Universal Animal-Trap; and I do hereby declare that the following is a full, clear, and exact description of the same, reference being had to the accompanying drawings and the letters and figures marked thereon, which form part of this specification.

The nature of my said invention consists in so constructing a trap that the animal, allured by the bait, advances upon an inclined plane of glass or other highly-polished material to another inclined glass surface of such a degree of inclination that the weight of the animal causes him to slide downward upon a swinging trap or door, which is opened by the weight of the animal upon the same and precipitates him into a box or pit below, when the trap-bottom automatically resumes its former position and is ready for another victim.

To enable those skilled in the art to understand how to construct and use my invention, I will proceed to describe the same with particularity, reference being made in so doing to the aforesaid drawings, in which—

Figure 1 represents a side elevation of my invention; Fig. 2, a vertical section of the same, taken at the line $x$ in Fig. 1; and Fig. 3, a vertical central section thereof, taken at right angles to the section shown in Fig. 2.

Similar letters of reference in the different figures denote the same parts of my invention.

A represents a close box of suitable dimensions, through the upper part of which, as shown at B, there is a passage-way from side to side, of suitable size to admit the animal, having its floor inclined each way toward the center, as shown in Fig. 2. At the center of said passage there is an opening through the floor of sufficient size to permit the animal to fall through, as hereinafter mentioned, which, however, is closed by the movable trap G, which has its upper surface covered with glass, as shown at H. This movable trap is arranged upon the lever, which is suspended upon a pivot or fulcrum, $h$, to the end of which lever is attached the weight I.

Directly above the movable trap H there is arranged a vertical tube, (marked C,) having suitable slots or openings $c$ in the lower end, in which the bait is placed.

The sides of the passages aforesaid are also lined with plates of glass, so that all the surfaces to which the animal has access are of glass, so that, having once commenced to slide downward, he cannot get any foothold whereby to check his descent.

J represents a steel spring projecting over the lever G, so that when the end is thrown up by the weight of the animal upon the movable trap H striking upon said spring it is immediately thrown back to the proper position.

Allured by the bait which is placed in the tube C, the animal approaches upon one of the inclined planes, E, and passes thence upon the more abruptly-inclined plane F, when he commences to slide down toward the center, the glass surfaces preventing him from using his claws or feet in obtaining a foothold to retard or check his descent, and falls upon the trap H, which his weight at once displaces, and he falls into the box below, whose sides are also covered with a glass strip (marked L) to prevent his climbing out. In this manner the animals may be caught, the trap resetting itself, until the box is full.

Having described my invention, I will now specify what I claim and desire to secure by Letters Patent:

1. The combination and arrangement of the inclined planes E F and the movable trap H, operating as and for the purposes set forth.

2. The combination of the lever G, trap H, weight I, and spring J, when arranged with respect to the inclines E F, substantially as specified and shown.

CHARLES MELONE.

Witnesses:
CHAS. CHADWICK,
JOS. M. VAUGHAN.